United States Patent [19]

Poulos

[11] Patent Number: 4,628,901

[45] Date of Patent: Dec. 16, 1986

[54] ASH CATCHER FOR BARBECUE KETTLE

[76] Inventor: Jon D. Poulos, 1651 Mount Pleasant St., Northfield, Ill. 60093

[21] Appl. No.: 832,012

[22] Filed: Feb. 24, 1986

[51] Int. Cl.$^4$ .............................................. F23J 1/00
[52] U.S. Cl. .................................. 126/243; 126/25 R
[58] Field of Search ................. 126/25 R, 25 A, 9 R, 126/9 A, 242–245, 160

[56] References Cited

U.S. PATENT DOCUMENTS

| | | | |
|---|---|---|---|
| 940,403 | 11/1909 | Patterson, Sr. | 126/243 |
| 2,484,239 | 10/1949 | Moon et al. | 126/243 |
| 3,126,881 | 3/1964 | Blotsky, Jr. | 126/245 |
| 3,515,122 | 6/1920 | Andrews | 126/243 |

FOREIGN PATENT DOCUMENTS

| | | | |
|---|---|---|---|
| 218702 | 5/1961 | Austria | 126/245 |
| 563649 | 2/1931 | Fed. Rep. of Germany | 126/243 |

Primary Examiner—James C. Yeung
Attorney, Agent, or Firm—McCaleb, Lucas & Brugman

[57] ABSTRACT

An ash catcher for a barbecue kettle comprises an open top tapered body shaped to fit within a trapezohedral space defined by upwardly-converging legs between the bottom of the kettle and a shelf connected to the lower ends of the legs. It has a profile enabling it to be withdrawn sidewise between adjacent legs. The embodiment illustrated comprises a triangular base wall and three trapezoidal side walls converging upwardly from the edges of the base wall. Ash-deflecting panels are hingedly connected to the respective side walls and are pivotally movable between upper, outwardly-extended, ash-deflecting, working positions, and lower, retracted positions folded along the side walls. Removable hooks are connected between adjacent ash-deflecting panels to hold them in their ash-deflecting, working positions.

9 Claims, 9 Drawing Figures

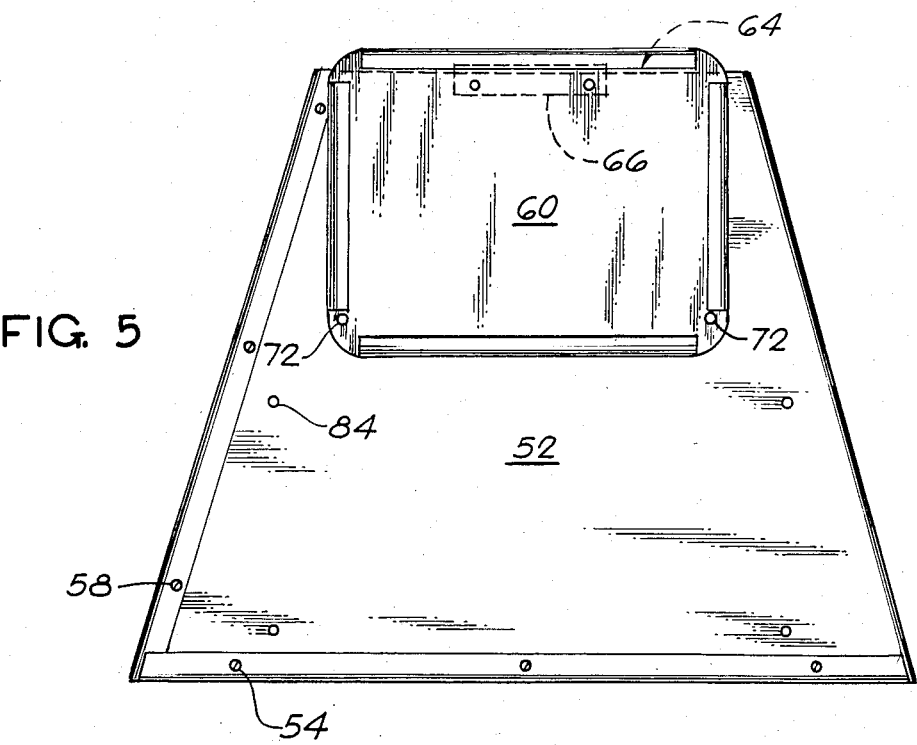
FIG. 5
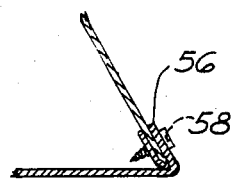
FIG. 8
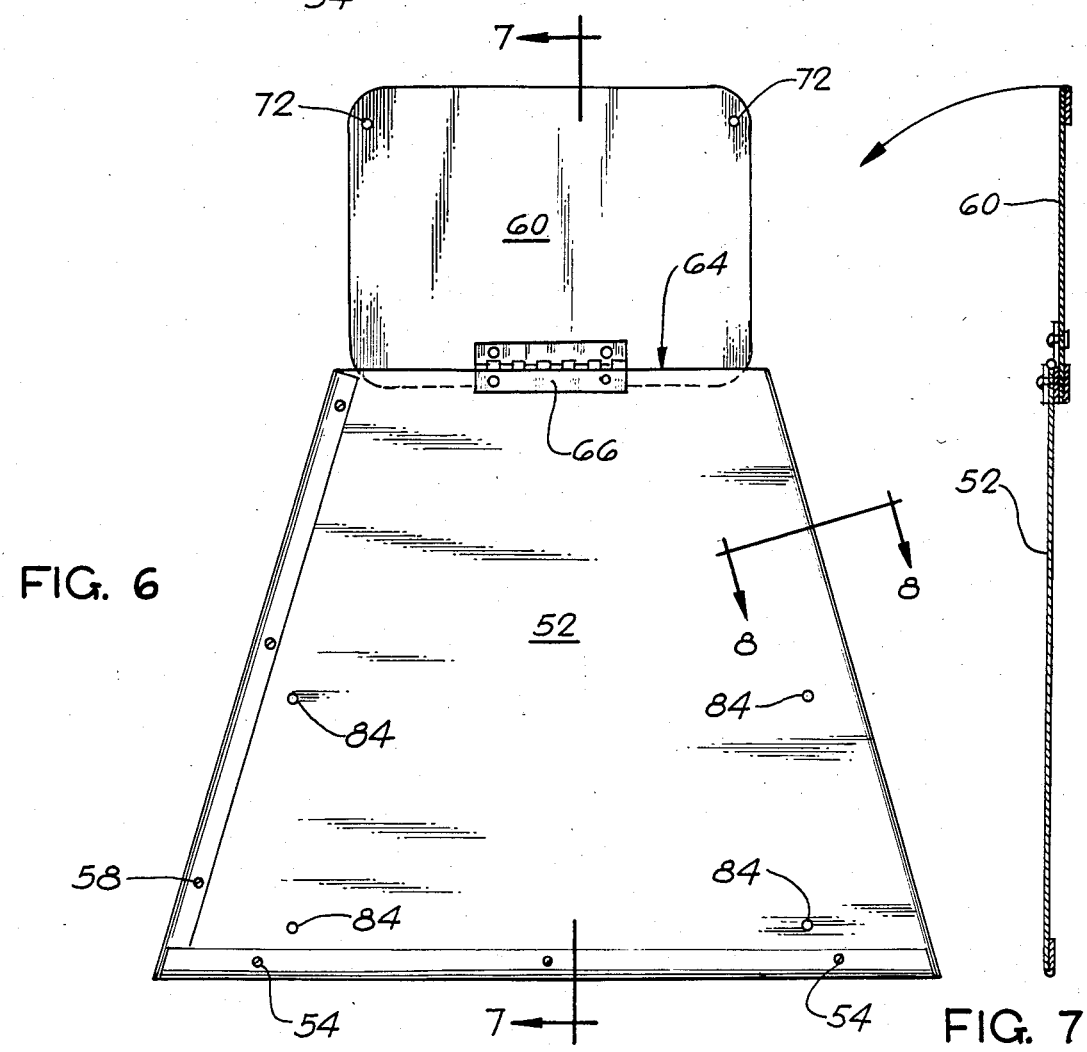
FIG. 6
FIG. 7

ASH CATCHER FOR BARBECUE KETTLE

BACKGROUND OF THE INVENTION

The present invention relates generally to ash-producing portable outdoor barbecue grills of the kettle type, and particularly to an improved ash catcher therefor.

Heretofore, conventional outdoor barbecue kettle grills with a fire bowl in a hemispheroidal shape have employed a shallow metal tray located beneath the bowl to collect ashes and coals that may drop through ash discharge and vent holes located in the bottom of the bowl. This tray is supported by three cutouts at the edge of the tray equidistant from one another and hook around the support legs of the grill.

Problems in collecting ashes with these conventional trays include:

1. There is no protection from winds blowing hot ashes or coals out of the tray with the possibility of damaging lawns, decks, and users' clothing and bare skin.

2. The shallow tray described requires that for it to be emptied it must be raised, twisted to unhook it from the legs, and then lowered to a point wide enough to allow it to be removed from between the legs. The capacity of the tray is limited, so this procedure must be repeated to empty the grill. Because of this inconvenience in emptying the ashes, draft is impaired much of the time by ashes covering the vents.

3. In addition to being a cumbersome chore, this procedure is messy and even dangerous if the ashes and coals have not completely cooled down.

There is a need for an ash catcher which positively prevents the scattering of hot ashes and coals by wind and careless use; which has a large storage capacity; and which is easy, simple, and clean to use.

SUMMARY OF THE INVENTION

The present invention is an improved ash catcher for conventional, portable, outdoor barbecue kettles of the type having a hemispheroidal bowl mounted at waist level on three downwardly-divergent legs.

Ash discharge and vent holes are located in the bottom of the bowl between the legs. Two of the legs are mounted on wheels and there is usually a shelf-like horizontal reinforcement platform at or near the axle level interconnecting and rigidifying the legs.

There is a substantial space below the kettle bottom which has heretofore been under-utilized. Except for the shallow ash tray which is ineffective for the reasons described above, that space has been completely wasted. One of the reasons for this may be the peculiar shape of the space which narrows upwardly making it impractical to fit a straight-sided ash container or bucket in that space because it would be too narrow at the top to collect ashes from the discharge holes offset outwardly beyond the edge of the container.

That peculiarly-shaped space, inside the legs, below the kettle bottom, and above the shelf 36, is that of a truncated pyramid with isosceles trapezoid shaped faces between the legs. For simplicity in this description, and in the claims, this shape and the corresponding shape of the ash catcher that fits within it are called "trapezohedral". Even a container of that special shape would, however, be ineffective where, as in many barbecue kettles, the ash discharge vents are located outwardly of that space.

This invention, therefore, has as a general object, the provision of a trapezohedral-shaped, ash-catching container to fit into the space beneath the kettle bottom, with a plurality of outwardly-disposed, ash-deflecting panels closely underlying the ash discharge holes in the kettle bottom.

Another object is to provide such an ash catcher in which the ash-deflector panels are hingedly connected to the ash-catcher body and pivotally movable between upper, extended, working positions, and lower, retracted, out-of-the-way positions folded down along the outside of the body to enable it to be readily withdrawn for emptying.

Another object is to provide such an ash catcher having an upwardly-converging profile sufficiently narrow to withdraw and replace it between two adjacent legs without interference.

Other ojects and advantages will be apparent from the following description taken in connection with the accompanying drawings.

BRIEF DESCRIPTION OF THE DRAWINGS

FIG. 5 is a side view of one of the three side walls with an upper, hinged, ash-deflecting panel in folded-down, retracted position;

FIG. 6 is a view similar to FIG. 5, with the hinged ash-deflecting panel in upwardly extended position;

FIG. 7 is a vertical cross-sectional view of FIG. 6 taken on line 7—7;

FIG. 8 is a fragmentary cross-sectional view of FIG. 6 taken on line 8—8 illustrating a connection between adjacent side walls.

Like parts are referred to by like reference characters.

DESCRIPTION OF THE PREFERRED EMBODIMENT

Figure 1:
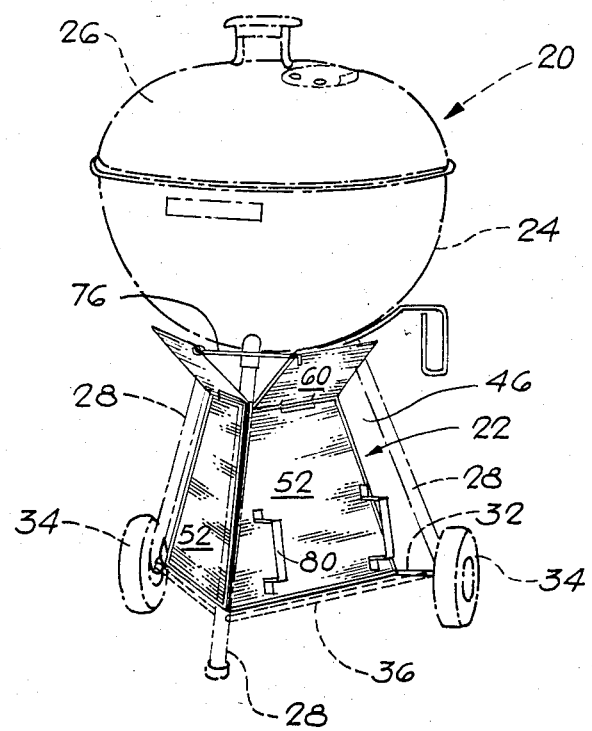
FIG. 1 is a perspective view of a barbecue kettle showing the improved ash catcher of the present invention in working position.

Referring now to the specific embodiment of the invention shown in the drawings, a conventional barbecue kettle with which the present invention may be used is generally designated 20. The ash catcher of the present invention is generally designated 22.

Figure 3:
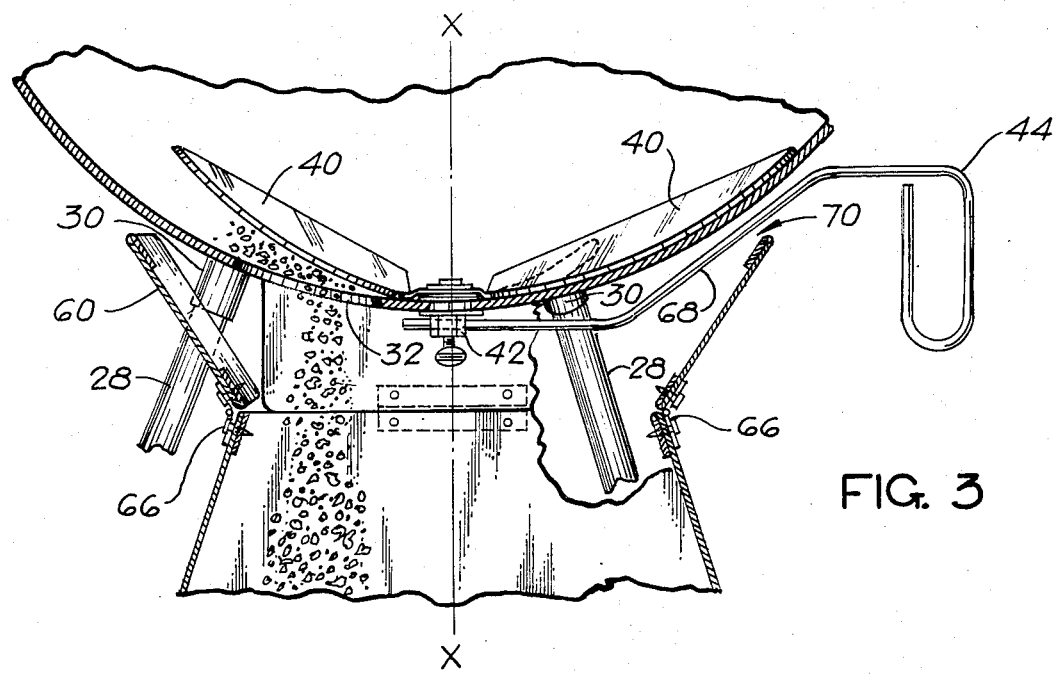
FIG. 3 is an enlarged, fragmentary vertical cross-section of FIG. 1.

The kettle 20 comprises a generally hemispheroidal kettle bottom portion 24 and a dome-shaped cover portion 26 extending symmetrically about a vertical center axis X—X (FIG. 3). A plurality (in the case, three) of downwardly diverging legs 28 are equally circumferentially spaced about the central axis and are connected to the kettle bottom portion by reinforcing sleeves 30. Two of the legs are supported on an axle 32 with outboard wheels 34,34 for portability. A triangular shelf-like reinforcement 36 at the axle level interconnects and rigidifies the leg structure and provides a ready-made shelf to support the ash catcher.

A plurality (in this case, three) of ash discharge and vent holes 38 are provided in the kettle bottom. These are located intermediate the legs and, depending on the model and the size, may extend radially outwardly to or various distances beyond the leg-connecting sleeves 30. In the model shown, three radial arms or paddles are curved to fit the inner surface of the kettle bottom and are fastened to a post 42 which is rotatably journaled in the kettle bottom along the center axis X—X. The post and arms are rotatable between positions opening and closing the ash discharge holes 38 by swinging an external handle 44 from side to side.

The space 46 bounded by the three legs 28 and between the kettle bottom 24 and shelf 36 is generally trapezohedral as defined above, with an upwardly-diminishing triangular cross-section. The ash catcher body has a matching shape with an upwardly-narrowing tapered body which effectively utilizes that peculiar-shaped space, and has an upwardly-converging profile enabling it to be withdrawn or replaced by a straight sidewise motion between two adjacent legs with no interference as will now be described.

Figure 4:
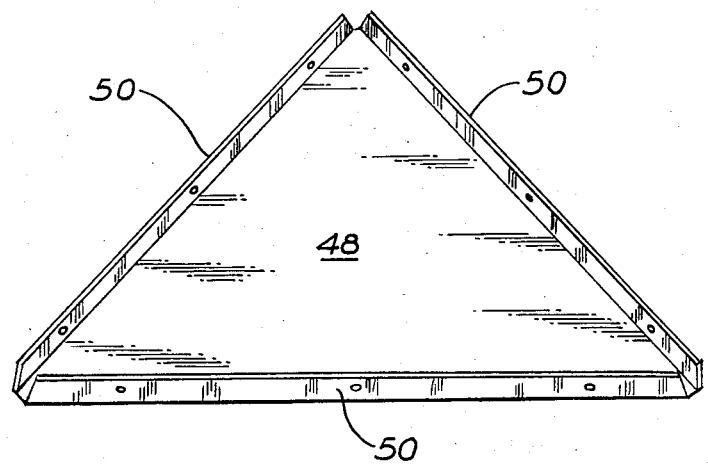
FIG. 4 is a perspective view of the bottom, base wall of the ash catcher.
Figure 9:
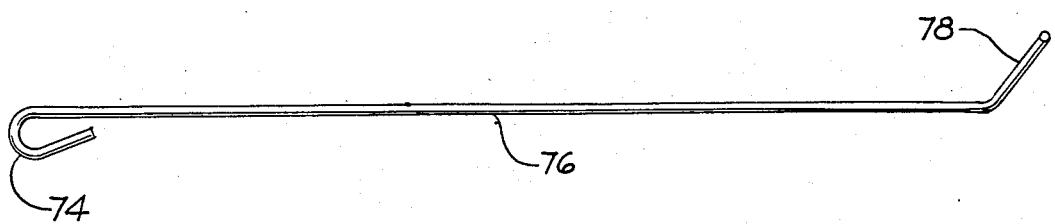
FIG. 9 is a side view of one of the wire hooks used in the ash catcher.

The ash catcher comprises a triangular base or wall 48 (FIG. 4) with straight, upright flanges 50 along the edges. Three upwardly converging trapezoidal side walls 52 (FIGS. 5 and 6) are fastened to the base plate by screws 54 and are fastened to one another along their upright edges by flanges 56 and screws 58 (FIGS. 1 and 8).

A plurality (in this case, three) of evenly, circumferentially-spaced, ash-deflecting panels 60 are provided to guide ashes from the vent holes 38 in the kettle bottom inwardly through the ash-receiving opening 62 defined by the upper edges 64 of the side walls. Each panel is hingedly connected to the corresponding top edge portion of the side wall by a hinge 66 and is pivotally movable between an upper, extended, working position as shown in FIGS. 1-3, and a lower, retracted position folded down along the corresponding side wall as shown in FIG. 5.

In the assembled, working position as shown in FIG. 3, the ash-deflecting panels extend upwardly above the ash discharging vents 38 and are very effective even in high winds to direct ashes into the catcher. However, in this working position, the top edges of the panels 60 are above the level of the lowermost, outer, center portion of the kettle along the axis X—X. Any attempt to withdraw the ash catcher sidewise with the panels in these upwardly extending positions would interfere with the kettle and prevent removal. The hinges 66 enable the panels to be pivoted downward, out-of-the-way, and thereby avoid this interference.

Figure 2:
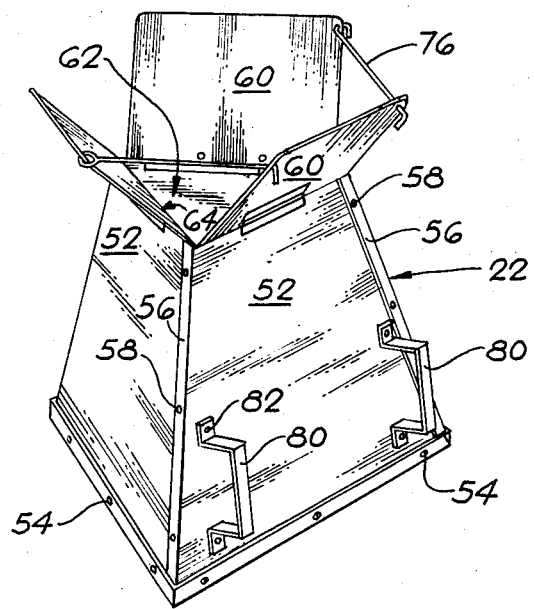
FIG. 2 is a perspective view of the ash catcher alone.

As shown in FIGS. 1 and 3, a special handle 44 may be provided with an upwardly angled section 68 passing through a clearance between the kettle wall and one of the deflector panels 60.

Each ash-deflector panel 60 has a pair of outer corner holes 72. Two of the panels have the looped end 74 of a wire hook 76 connected into it. The other end has a right angle offset 78 removably engagable in one of the holes 72 in an adjacent panel 60 as shown in FIGS. 1 and 2. Two of these wire hooks, when so engaged, hold all three panels in their upper, extended positions to deflect ashes inwardly into the catcher body as shown in FIG. 3.

Handles 80, attached by screws 82 in holes 84 in a front one of the panels 52 are useful for removal, emptying, and replacing the ash catcher. The profile of the ash catcher must be narrower than the space between adjacent legs to enable movement of the container in and out of the ash catching position.

Use and operation is believed apparent from the above description. Briefly, the catcher is designed to be shipped and sold disassembled in a very compact carton. Hence, the bottom base wall 48, side walls 52 with folded-down panels 60, and handles 80 will be packaged and shipped disassembled, to be assembled by the dealer or customer by means of screws 54, 58, and 82.

With all three deflector panels 60 in their retracted, folded down positions shown in FIG. 5, the ash catcher can be grasped by the handles 80 and slid into place on the shelf 36. Then, by lifting the panels 60 into their upper, working positions and connecting them together by the two hooks 76 as shown in FIGS. 1 and 2, it is ready to use. Removal for emptying is carried out in reverse after first releasing hooks 76 and lowering the ash-deflecting panels so they will not interfere with the underside of the kettle bottom when withdrawn.

By providing the ash catcher body in the special shape described, it utilizes the entire trapezohedral space 46 and as a result has such a large capacity that a typical week-end user may not have to empty it more than once or twice a season. The embodiment described and shown to illustrate the present invention has been necessarily specific for purposes of illustration. Alterations, extensions, and modifications would be apparent to those skilled in this art. For example, while the ash catcher is illustrated with a triangular cross-section for use specifically with the popular three-legged barbecue kettle which is widely in use, it may be of any other suitable cross-section for use even with kettles having four or moe legs. The aim of the appended claims, therefore, is to cover all such changes and modifications included within the spirit and scope of the invention.

The embodiments of the invention in which an exclusive property or priviledge is claimed are defined as follows:

1. An ash catcher for a barbecue kettle with a generally hemispheroidal bottom extending around a vertical center axis, a plurality of downwardly diverging legs extending from the kettle bottom, a shelf supported between the lower portions of the legs and defining with said legs a trapezohedral space beneath the bottom, ash discharge and vent holes in the bottom between the legs being outwardly offset from the center axis, said ash catcher having:
    an upwardly-narrowing tapered container body with an upper, ash-receiving opening, said body being shaped to fit within said trapezohedral space when supported on said shelf, and a profile enabling it to be withdrawn sidewise between adjacent legs;
    a plurality of ash-deflecting panels hingedly connected to the body around said ash-receiving opening;
    said panels being pivotally movable between upper positions immediately underlying the ash discharge and vent holes in the kettle bottom when the ash catcher is supported on the shelf, and lower positions to clear the kettle bottom when the ash catcher is withdrawn; and
    removable connecting means interconnecting the panels to hold them in their said upper positions during normal use of the kettle.

2. An ash catcher for a barbecue kettle according to claim 1 in which the connecting means consists of hooks removably connected between adjacent ash-defelecting panels.

3. An ash catcher for a barbecue kettle according to claim 1 having handle means on the side of the body.

4. An ash catcher for a barbecue kettle according to claim 1 in which the body comprises a polygonal base wall and trapezoidal side walls converging upwardly from respective edges of the base wall.

5. An ash catcher for a three-legged barbecue kettle according to claim 1 in which the body comprises a triangular base wall and three trapezoidal side walls converging upwardly from the edges of the base wall.

6. An ash catcher for a barbecue kettle comprising:
   an upwardly-narrowing tapered body with sidewalls having an upper, ash-receiving opening, said body being shaped to fit within a trapezohedral space:
   a plurality of evenly, circumferentially-spaced, ash-deflecting panels hingedly connected to the upper ends of the respective sidewalls around said ash-receiving opening;
   said panels being pivotally movable between upper, outwardly extended positions, and lower retracted positions folded along the sidewalls of the body;
   hooks temporarily interconnecting adjacent of said panels to hold them in their said upper, outwardly extended positions, said hooks being tangentially disposed and outwardly offset relative to the ash-receiving opening to keep said opening clear for the receipt of ashes; and
   handle means on the side of the body.

7. An ash catcher for a barbecue kettle according to claim 6 in which the body comprises a polygonal base wall and trapezoidal side walls converging upwardly from respective edges of the base wall, said ash-deflecting panels are hingedly connected to the respective side walls, and said hooks are interconnected between adjacent edges of some of said panels.

8. An ash catcher for a barbecue kettle according to claim 6 in which the body comprises a triangular base wall and three trapezoidal side walls converging upwardly from the edges of the base wall, three ash-deflecting panels are respectively hingedly connected to said three side walls and there are at least two of said hooks interconnected between adjacent panels.

9. An ash catcher for a barbecue kettle with a generally hemispheroidal bottom extending around a vertical center axis, a plurality of downwardly diverging legs extending from the kettle bottom, a shelf supported between the lower portions of the legs and defining with said legs a trapezohedral space beneath the bottom, ash discharge and vent holes in the bottom between the legs being outwardly offset from the center axis, a central shaft journaled in the bottom of said kettle for rotation about said axis and means carried by said shaft for opening and closing said ash discharge and vent holes in response to rotation thereof, said ash catcher having:
   an upwardly-narrowing tapered container body with an upper, ash-receiving opening, said body being shaped to fit within said trapezohedral space when supported on said shelf, and a profile enabling it to be withdrawn sidewise between adjacent legs;
   a plurality of ash-deflecting panels hingedly connected to the body around said ash-receiving opening;
   said panels being pivotally movable between upper positions immediately underlying the ash discharge and vent holes in the kettle bottom when the ash catcher is supported on the shelf, and lower positions to clear the kettle bottom when the ash catcher is withdrawn;
   removable connecting means interconnecting the panels to hold them in their said upper positions during normal use of the kettle; and
   elongated handle means adapted to be connected to said central shaft and having an intermediate, diagonal section adapted to extend outwardly through a space between the bottom of the kettle and one of said panels.

* * * * *